United States Patent
Viering et al.

(10) Patent No.: US 11,240,802 B2
(45) Date of Patent: Feb. 1, 2022

(54) FULL UPLINK BLANKING TO AVOID RF IMPAIRMENTS FOR DEVICES WITH MULTIPLE CONNECTIONS

(71) Applicant: Nokia Technologies Oy, Espoo (FI)

(72) Inventors: Ingo Viering, Munich (DE); Frank Frederiksen, Klarup (DK); Ahmad Awada, Munich (DE)

(73) Assignee: Nokia Technologies Oy, Espoo (FI)

( * ) Notice: Subject to any disclaimer, the term of this patent is extended or adjusted under 35 U.S.C. 154(b) by 66 days.

(21) Appl. No.: 16/781,947

(22) Filed: Feb. 4, 2020

(65) Prior Publication Data
US 2020/0267723 A1    Aug. 20, 2020

Related U.S. Application Data (60) Provisional application No. 62/805,452, filed on Feb. 14, 2019.

(51) Int. Cl.
| | | |
|---|---|---|
| *H04W 4/00* | (2018.01) | |
| *H04W 72/04* | (2009.01) | |
| *H04W 76/15* | (2018.01) | |
| *H04W 36/10* | (2009.01) | |

(52) U.S. Cl.
CPC ....... *H04W 72/0446* (2013.01); *H04W 36/10* (2013.01); *H04W 76/15* (2018.02)

(58) Field of Classification Search
CPC .. H04W 72/0446; H04W 76/15; H04W 36/10
See application file for complete search history.

(56) References Cited

U.S. PATENT DOCUMENTS

| | | | |
|---|---|---|---|
| 9,648,634 B2 | 5/2017 | Fanous et al. | |
| 9,949,183 B2 | 4/2018 | Axmon et al. | |
| 2011/0096703 A1* | 4/2011 | Nentwig | H04B 7/2643 370/294 |
| 2011/0243095 A1* | 10/2011 | Chin | H04W 36/06 370/331 |
| 2015/0173065 A1* | 6/2015 | Fu | H04L 1/1896 370/280 |
| 2015/0208410 A1* | 7/2015 | Koutsimanis | H04W 72/0426 370/252 |
| 2016/0088534 A1* | 3/2016 | Axmon | H04W 24/10 370/252 |

(Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 15)", 3GPP TS 36.212, V15.4.0, Dec. 2018, pp. 1-247.

(Continued)

*Primary Examiner* — Abdelnabi O Musa
(74) *Attorney, Agent, or Firm* — Nokia Technologies Oy (57) ABSTRACT

In accordance with an example embodiment of the present invention, a method comprising: receiving, by a user equipment, instructions based on a determination that a communication sent from the user equipment to at least one network comprising signaling to at least one network node over continuous time slots of at least one uplink connection would cause a problem with the communication; and based on the instructions, preventing by the user equipment the signaling over at least one particular time slot of the at least one uplink connection to overcome the problem, wherein the instructions are received in a recurring pattern indicating the at least one particular time slot.

18 Claims, 10 Drawing Sheets

(56) References Cited

U.S. PATENT DOCUMENTS

| | | | |
|---|---|---|---|
| 2016/0119820 A1* | 4/2016 | Lin | H04W 28/16 370/342 |
| 2016/0278030 A1 | 9/2016 | Yi et al. | |
| 2016/0295522 A1 | 10/2016 | Qin et al. | |
| 2018/0213538 A1 | 7/2018 | Na | |
| 2018/0317148 A1* | 11/2018 | Jin | H04W 36/08 |
| 2018/0368199 A1 | 12/2018 | Zeng et al. | |
| 2019/0150143 A1* | 5/2019 | Yin | H04L 1/1861 370/329 |

OTHER PUBLICATIONS

"The Analysis of LTE Mobility Interruption and Possible Enhancement Directions", 3GPP TSG-RAN WG2 Meeting #103bis, R2-1814460, Agenda: 12.3.2, Nokia, Oct. 8-12, 2018, 4 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.3.0, Sep. 2018, pp. 1-918.

"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474.

Bryan et al., "JavaScript Object Notation (JSON) Patch", RFC 6902, Internet Engineering Task Force (IETF), Apr. 2013, pp. 1-18.

Martin et al., "On Muting Mobile Terminals for Uplink Interference Mitigation in HetNeTs-System-level Analysis via Stochastic Geometry", EURASIP Journal on Wireless Communications and Networking, Apr. 2019, pp. 1-28.

"LTE to 5G: Cellular and Broadband Innovation", Mobile Broadband Transformation, Rysavy Research/5G Americas, Aug. 2017, pp. 1-214.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

| Uplink-downlink configuration | Uplink Percentage | Offset | \multicolumn{10}{c}{Subframe number} |
|---|---|---|---|---|---|---|---|---|---|---|---|---|

| Uplink-downlink configuration | Uplink Percentage | Offset | 0 | 1 | 2 | 3 | 4 | 5 | 6 | 7 | 8 | 9 |
|---|---|---|---|---|---|---|---|---|---|---|---|---|
| 1 | 40% | 0 | D | S | U | U | D | D | S | U | U | D |
| 1 | 40% | 2 | U | U | D | D | S | U | U | D | D | S |
| 2 | 20% | 0 | D | S | U | D | D | D | S | U | D | D |
| 2 | 20% | 3 | D | D | D | S | U | D | D | D | S | U |
| 0 | 60% | 0 | D | S | U | U | U | D | S | U | U | U |
| 1 | 40% | 2 | U | U | D | D | S | U | U | D | D | S |

410 → (rows 1–2)
415 → (rows 3–4)
420 → (rows 5–6)

FIG. 4

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |
| 7 | 5 ms | D | S | U | U | D | D | S | U | D | D |
| 8 | 5 ms | D | S | U | D | D | D | S | U | D | D |
| 9 | 5 ms | D | S | U | D | D | D | S | D | D | D |

| Muting Configuration | Subframe number | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 1a | M | U | M | U | M | U | M | U | M | U | M | U | M | U | M | U | M | U | M | U |
| 1b | U | M | U | M | U | M | U | M | U | M | U | M | U | M | U | M | U | M | U | M |
| 2a | U | U | U | U | M | M | M | M | M | M | U | U | U | U | M | M | M | M | M | M |
| 2b | M | M | M | M | U | U | U | U | U | U | M | M | M | M | U | U | U | U | U | U |
| 3a | M | M | M | M | M | M | M | M | U | U | M | M | M | M | M | M | U | U | U | U |
| 3b | U | U | U | U | U | M | M | M | M | M | U | U | U | U | U | M | M | M | M | M |
| 3c | M | M | M | M | M | U | U | U | U | U | M | M | M | M | M | U | U | U | U | U |

810: determining, by a network node, that a communication sent from a user equipment to at least one network node comprising signaling over continuous timeslots of at least one uplink connection would cause a problem with the communication 820: based on the determining, sending towards the user equipment instructions preventing the user equipment from sending the signaling over at least one particular time slot of the at least one uplink connection to overcome the problem, wherein the instructions are sent in a recurring pattern indicating the at least one particular timeslot

FIG. 8A

850: receiving, by a user equipment, instructions based on a determination that a communication sent from the user equipment to at least one network comprising signaling to at least one network node over continuous timeslots of at least one uplink connection would cause a problem with the communication 860: based on the instructions, preventing by the user equipment the signaling over at least one particular time slot of the at least one uplink connection to overcome the problem, wherein the instructions are received in a recurring pattern indicating the at least one particular timeslot

FIG. 8B

FULL UPLINK BLANKING TO AVOID RF IMPAIRMENTS FOR DEVICES WITH MULTIPLE CONNECTIONS

TECHNICAL FIELD

The teachings in accordance with the exemplary embodiments of this invention relate generally to instructing a user equipment to not transmit an uplink signal that is determined to cause a problem with communications from the user equipment and, more specifically, relate to blanking or muting specific uplink time slots defined for a user equipment to cause the user equipment to not transmit the uplink signal on the specific uplink time slots to overcome the problem.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
- eCoMP Enhanced Cooperative Multi-Point
- eICIC Enhanced Intercell Interference Coordination
- eNB evolved NB (=LTE base station)
- EN-DC EUTRA-NR Dual Connectivity
- FDD Frequency Division Duplex
- HARQ Hybrid Automatic Repeat Request
- gNB next generation eNB (=NR base station)
- LTE Long Term Evolution
- MeNB master eNB
- NR New Radio (=5G)
- NWN Network Node
- OFDMA Orthogonal Frequency Division Multiple Access
- PDSCH Physical Downlink Shared Channel
- PUCCH Physical Uplink Control Channel
- PUSCH Physical Uplink Shared Channel
- RF Radio Frequency
- SC-FDMA Single Carrier Frequency Division Multiple Access
- SeNB secondary eNB
- SUO Single Uplink Operation
- TDD Time Division Duplex
- TDM Time Division Multiplexing
- UE User Equipment (=terminal)

Carrier Aggregation (CA) and dual connectivity (DC) were introduced in 3GPP to allow a UE to simultaneously transmit and receive data on multiple component carriers via a single eNB or from two cell groups via a master eNB (MeNB) and secondary eNB (SeNB). Dual Connectivity and Carrier Aggregation enhancements include new radio (NR) enhancements such as to support asynchronous and synchronous NR Dual Connectivity, low latency cell configuration, and setup for NR operations.

Example embodiments of the invention work to improve such carrier aggregation, dual connectivity operations and dual connected handover, in particular for LTE and NR.

SUMMARY

Various aspects of examples of the invention are set out in the claims.

According to a first aspect of the present invention, a method comprising: receiving, by a user equipment, instructions based on a determination that a communication sent from the user equipment to at least one network comprising signaling to at least one network node over continuous time slots of at least one uplink connection would cause a problem with the communication; and based on the instructions, preventing by the user equipment the signaling over at least one particular time slot of the at least one uplink connection to overcome the problem, wherein the instructions are received in a recurring pattern indicating the at least one particular time slot.

According to a second aspect of the present invention, an apparatus comprising: at least one processor; and at least one memory including computer program code, wherein the at least one memory and the computer program code are configured, with the at least one processor, to cause the apparatus to at least: receive instructions based on a determination that a communication sent from the apparatus to at least one network comprising signaling to at least one network node over continuous timeslots of at least one uplink connection would cause a problem with the communication; and based on the instructions, prevent the signaling over at least one particular time slot of the at least one uplink connection to overcome the problem, wherein the instructions are received in a recurring pattern indicating the at least one particular timeslot.

According to a third aspect of the present invention, A non-transitory computer storage medium encoded with a computer program, the program comprising instructions that when executed by one or more computers cause the one or more computers to perform operations comprising: receiving, by a user equipment, instructions based on a determination that a communication sent from the user equipment to at least one network comprising signaling to at least one network node over continuous time slots of at least one uplink connection would cause a problem with the communication; and based on the instructions, preventing by the user equipment the signaling over at least one particular time slot of the at least one uplink connection to overcome the problem, wherein the instructions are received in a recurring pattern indicating the at least one particular time slot.

According to a fourth aspect of the present invention, a method comprising: determining, by a network node, that a communication sent from a user equipment to at least one network comprising signaling over continuous timeslots of at least one uplink connection would cause a problem with the communication; and based on the determining, sending towards the user equipment instructions preventing the user equipment from sending the signaling over at least one particular time slot of the at least one uplink connection to overcome the problem, wherein the instructions are sent in a recurring pattern indicating the at least one particular timeslot.

According to a fifth aspect of the present invention, an apparatus comprising: determine that a communication sent from a user equipment comprising signaling over continuous timeslots of at least one uplink connection would cause a problem with the communication; and based on the determining, send towards the user equipment instructions preventing the user equipment from sending the signaling over at least one particular time slot of the at least one uplink connection to overcome the problem, wherein the instructions are sent in a recurring pattern indicating the at least one particular timeslot.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In accordance with example embodiments of the invention, there is proposed a method and apparatus to instruct a network device such as a user equipment to blank specific uplink time slots to prevent uplink signals from being transmitted on the specific uplink time slots determined to cause a problem for communications from the network device.

Example embodiments of this invention addresses a cellular and mobile communication system such as Long Term Evolution (LTE) or new radio (NR). There are multiple methods proposed and also specified, where a UE simultaneously connects to multiple cells transmitting multiple uplink signals simultaneously. The example embodiments of the invention address LTE, but NR and other mobile communication system may also be covered.

Concrete examples for simultaneous uplinks are:

Carrier Aggregation (Rel11 LTE, Rel15 NR): the UE simultaneously transmits uplinks signals on multiple carriers to the same eNB/gNB;

Dual Connectivity (Release 12 LTE, Rel15 EN-DC): the UE transmits multiple uplink signals on multiple carriers to two different eNBs/gNBs;

Dual Connected handover (Release 16 LTE, Rel16 NR): there are at the time of this application two Release 16 work items for mobility enhancements, one for LTE and one for NR. One of the key targets is to reduce the handover interruption time to zero milliseconds (in NR), or at least as close as possible to 0 ms. This can only be achieved by setting up the target cell before detaching from the source cell. Hence, for a short time, the UE will be simultaneously connected to both, source and target cell.

Those examples have been specified (or are planned to be specified) since they may provide significant benefits in terms of throughput, interruption and/or robustness.

For many of those methods it is likely that two transmitter chains are needed in the terminal. However, even with two individual transmitter chains, RF impairments might be created, in particular intermodulation products. Due to the extremely small size of the terminals, there will be a lot of undesired coupling of signals. For instance, the two transmitted signals will superimpose and create intermodulation, even though they are not connected by intention. Similarly, these intermodulation products may couple accidentally into receivers inside the same terminal. If the frequency of the intermodulation products (which is typically a linear combination of the frequencies of the involved SC-FDMA/OFDMA signals) coincide with the frequency of a signal that shall be received by the terminal, then it is likely that this signal cannot be detected. The UE DL reception will thereby be disturbed by the RF impairments.

There are cases, where the RF impairments are not critical, e.g. when the intermodulation products do not coincide with a frequency where other signals have to be received. However, there are also cases where the RF impairments are critical (for instance where the RF impairments create intermodulation products on the transmitted signal, thereby potentially causing the UE not to be able to fulfil the spectrum emission requirements in the frequency domain). Then, simultaneous uplink transmissions have to be avoided. The typical assumption is that the involved uplinks apply time division multiplex (TDM) patterns such that only one uplink can transmit at a time, and all the other uplinks are blanked.

The same has to be done, if those multiple connections shall be possible even for UEs which only have a single uplink transmit chain. This would be desirable to provide the benefits of multiple connections also to low cost terminals. Note, that at least this would require complete blanking of all but one uplink, since the single transmit chain can be used for only one uplink at a time. For RF impairments, we may argue that a second uplink with much less power may mitigate the RF impairments.

Whereas blanking the uplink data channel, e.g. the Physical Uplink Shared Channel (PUSCH) in LTE and NR can obviously be achieved by not scheduling the uplink, blanking the PUCCH is more challenging. This is for at least the reasons that:

The UE has to send HARQ feedback for downlink transmissions. For LTE, the timing of the HARQ feedback is fixed by a coupling of the uplink transmission timing for the HARQ-ACK to the subframe index that the PDSCH was received in. This cannot dynamically be influenced by the network; and The UE can also transmit autonomously, e.g. scheduling requests. These transmissions can also not be influenced by the network, as the configuration of SR is following periodic parameters from the RRC configuration.

Hence, the proposed methods are not seen to be sufficient to achieve complete uplink blanking (including PUCCH).

Example embodiments of the invention work to address at least these shortfalls. Below further issues with prior art proposals are discussed.

Time Division Duplex (TDD) Patterns

Figure 1A:
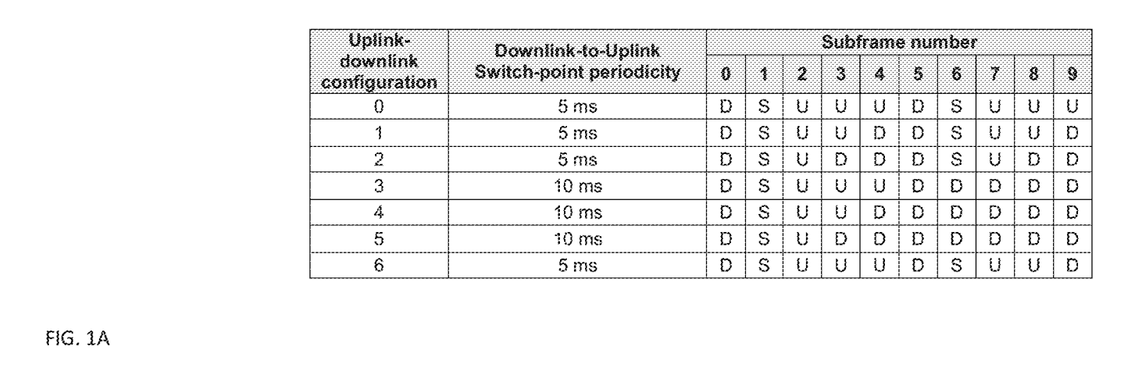
FIG. 1A shows Time Division Duplex patterns in LTE.

One proposed solution to these problems is for TDD. In a proposed solution for TDD the uplink has to be fully blanked to allow for downlink reception. To this end, the standard has defined TDD patterns which clarify for the UE that it is not allowed to send any signal, i.e. even no PUCCH. The TDD patterns are signalled to the UE. Table 1 of FIG. 1A lists the TDD patterns as specified in 36.212 for LTE. "D" indicated subframes used for downlink, "U" indicated subframes used for uplink, and "S" indicates "special subframes" which usually contain a guard period for switching from downlink to uplink, as well as some uplink and/or downlink components.

While prohibiting uplink transmission is seen to be relatively trivial, 3GPP also had to clarify how to deal with the missing HARQ feedback. Without a 3GPP clarification, the base station could have either predictively skipped downlink transmissions in subframes which would require HARQ feedback in the blanked uplink subframes, or the base station could have accepted that HARQ feedback is lost (which may also happen in channel fades) and waited for the next HARQ cycle. Both would have obviously been dirty solutions which would have led to performance degradation. Hence, 3GPP has provided a proper solution for TDD by re-designing the HARQ timing for every TDD pattern, clarifying which uplinks carry the HARQ feedback for a specific downlink subframe (which breaks the original regular HARQ timing).

Scheduling request can be simply postponed to the next uplink time frame.

Single Uplink Operation (SUO) for EN-DC

Figure 1B:
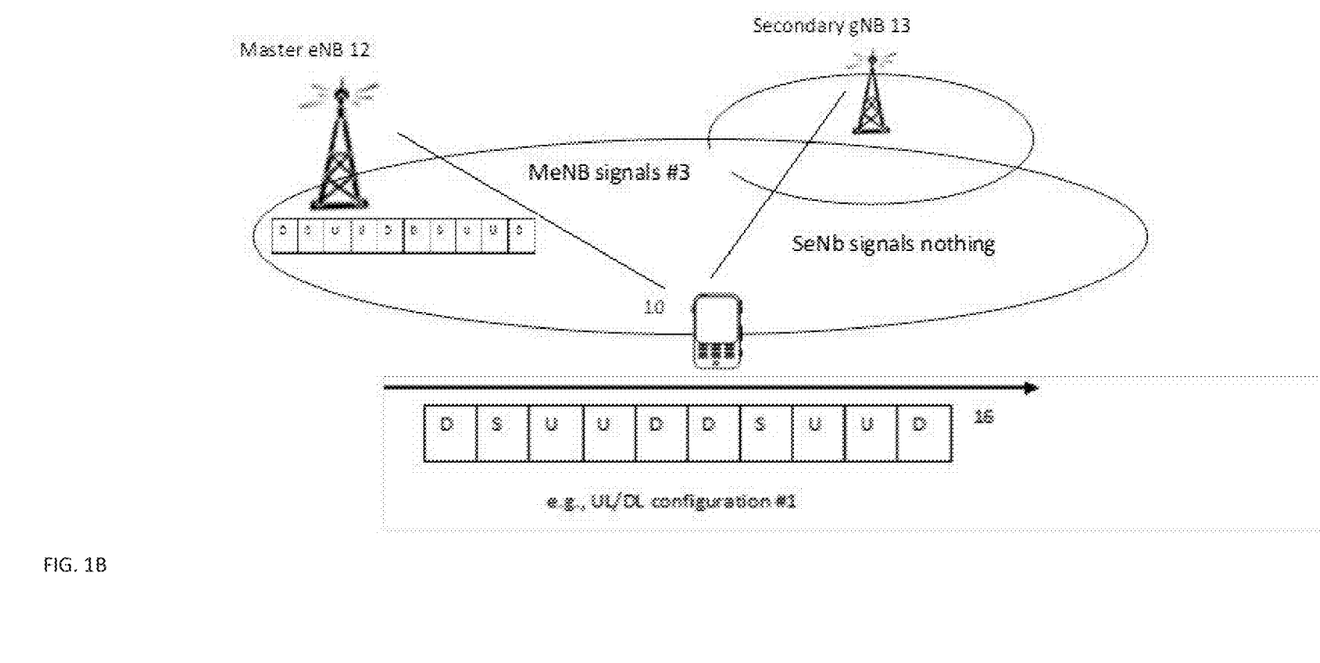
FIG. 1B shows EUTRA-NR Dual Connectivity with single uplink operation.

FIG. 1B illustrates the SUO for EN-DC. As shown in FIG. 1B the UE 10 is dual-connected to a LTE Master eNB 12 and to a NR Secondary gNB 13, using a configuration 16 based on different frequency bands that is predefined for the UE 10. It was identified, that for certain band combinations, that simultaneous uplinks would create intermodulation products at a frequency which coincides with the frequency used for downlink reception of the LTE carrier. Furthermore, some UE vendors wanted to allow for implementations of EN-DC with a single transmitter chain.

In order to avoid the effort for re-designing the HARQ timing (see the explanation above), 3GPP has abused the TDD patterns for which the problem was already solved. In contrast to actual TDD, downlink transmissions are allowed continuously (i.e. also in uplink subframes), but uplink transmissions are restricted to the uplink subframes. So, the LTE eNB sends the TDD pattern to the UE such that the UE transmissions spare out the "D" (and "S") subframes which then can be used for the NR uplink.

On the NR side, the HARQ timing is more flexible and the uplinks can be completely blanked by appropriate scheduling. The coordination of the uplink patterns is done via X2 during the procedure to add the Secondary gNB.

It needs to be emphasized that the SUO solution has only addressed FDD.

Dual Connected Handover for FDD

Similar TDM solutions might be proposed for the dual connected handover. This is discussed for LTE at the time of this application, where both involved cells have to provide a solution for the HARQ timing (in EN-DC it was only the LTE-MeNB). Coordination of the patterns can be done via X2 during the initiation of the handover, similar to EN-DC.

Figure 3:
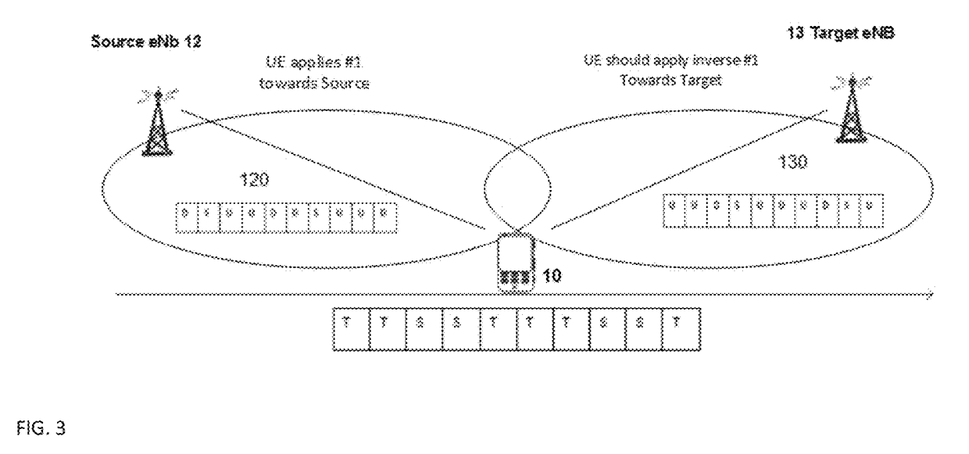
FIG. 3 shows Dual Handover with single uplink operation.

FIG. 3 illustrates what SUO for a dual connected handover in LTE may look like. As shown in FIG. 3 the UE 10 applies #1 configuration 120 towards the source (S) and the UE 10 applies inverse #1 configuration 130 towards the Target (T) eNB 13. The general notion of dual connected handover is that the UE sets up the target cell (typically on the same carrier) before detaching from the source. For example both connections can exist in parallel for a while. Since typically, non-ideal backhaul is assumed, there is no inherent coordination of the source and target cell's schedulers. Uplink transmission can for instance be organized such that e.g. subframe 1,2,5,6,7,10 are sent to the target cell, and subframe 3,4,8,9 are sent to the source cell.

Figure 4:
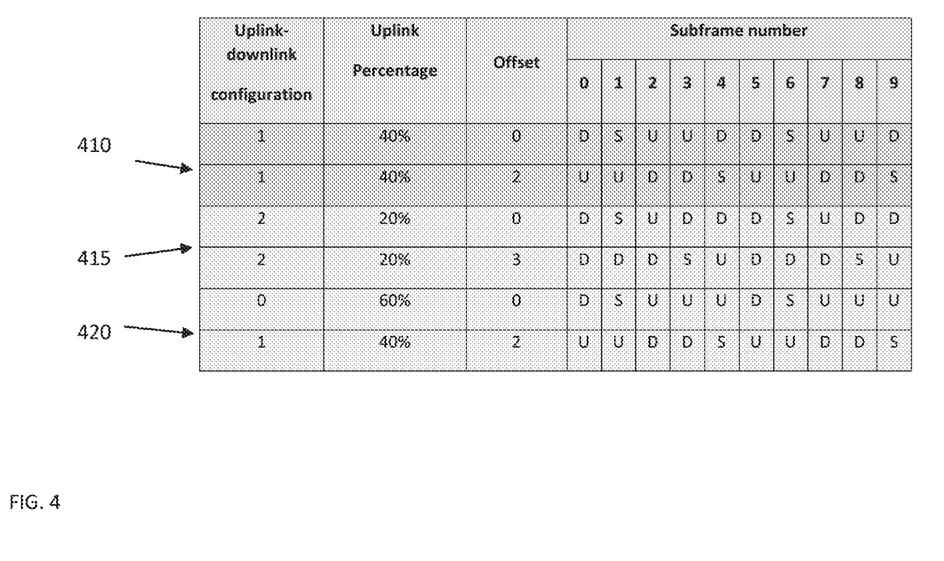
FIG. 4 shows Table 2 of Pairs of Time Division Duplex patterns with mutual exclusive uplink subframes.

Again, it is possible in principle to abuse the existing TDD patterns, by using an offset to shift the TDD patterns of source and target cell against each other. Three possible solution pairs are given in Table 2 of FIG. 4. All rows are shifted versions from the basic patterns in Table 1 of FIG. 1A. In the pair 410, the pair 415 and the pair 420 of FIG. 4 it is observed that uplinks do not coincide. The offset is already specified in the EN-DC/SUO specification at the time of this application.

Dual Connected Handover for TDD

Unfortunately, a similar trick (abusing existing 3GPP patterns) cannot be applied for TDD. For TDD we have the additional constraint that a UE cannot receive the downlink when any uplink is transmitted (recall that the involved cells are on the same carrier). This implies that source and target cell must use the same TDD pattern without any offset. With the solution pairs 410, 415, and 420 in Table 2 of FIG. 4, most of the downlink transmissions would be killed by a parallel uplink transmission.

Hence, coordinated blanking of the uplinks in TDD cannot be done with signalling at the time of this application.

Other Existing Blanking Mechanisms

For the sake of completeness, we will list other existing blanking mechanisms and explain why those are not usable:
  eICIC and eCoMP: with both methods we can blank individual PRBs, or whole subframes. However, these apply only to the downlink, they do not cover the uplink. Furthermore, the target is interference coordination on the data channel (PDSCH), they do not address control channels. For instance, reference symbols are still transmitted in the downlink and that is why eICIC calls the muted subframes "almost blanked subframes." Recall that entirely blanked subframes can be needed; and
  MBMS subframes: indeed, these subframes are blanked entirely, but again only on the downlink. They do not address uplink with the specific problems.

In accordance with example embodiments of the invention there is proposed a method where the network instructs a UE to completely blank specific uplink timeslots of a certain connection, i.e. the UE is not allowed to transmit any signal during specific timeslots of a certain connection. In general, the UL blanking would be applied to a dedicated UL connection from a UE to a specific base station or cell. This can be signalled from a base station to the UE via a recurring muting pattern which indicates the timeslots which have to be blanked. Alternatively, existing TDD patterns can be extended appropriately as disclosed herein.

Figure 2:
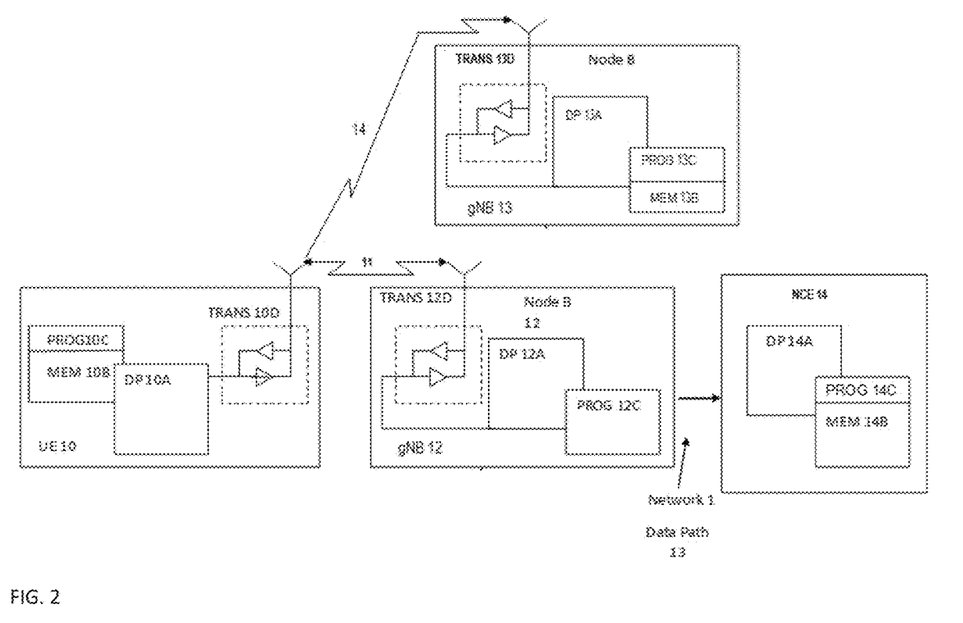
FIG. 2 shows a high level block diagram of various devices used in carrying out various aspects of the invention.

Before describing the example embodiments of the invention in detail, reference is made to FIG. 2 for illustrating a simplified block diagram of various electronic devices that are suitable for use in practicing the example embodiments of this invention.

FIG. 2 shows a block diagram of one possible and non-limiting exemplary system in which the example embodiments of the invention may be practiced. In FIG. 2, a user equipment (UE) 10 is in wireless communication with a wireless network 1. A UE is a wireless, typically mobile device that can access a wireless network. The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 14 to gNB 12 and gNB 14, respectively. The one or more memories MEM 10B include computer program code PROG 10C. The UE 10 communicates with gNB 12 and/or gNB 13 via a wireless link 111.

The gNB 12 (NR/5G Node B or possibly an evolved NB) is a base station such as a master or secondary node base station (e.g., for NR or LTE long term evolution) that communicates with devices such as gNB 13 and UE 10 of FIG. 2. The gNB 12 provides access to wireless devices such as the UE 10 to the wireless network 1. The gNB 12 includes one or more processors DP 12A, one or more memories MEM 12B, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories 12B and the computer program code PROG 12C are configured to cause, with the one or more processors DP 12A, the gNB 12 to perform one or more of the operations as described herein. The gNB 12 may communicate with another gNB or eNB, such as the gNB 13. Further, the link 11 and or any other link may be wired or wireless or both and may implement, e.g., an X2 or Xn interface. Further the link 11 may be through other network devices such as, but not limited to an NCE/MME/SGW device such as the NCE 14 of FIG. 2.

The gNB 13 (NR/5G Node B or possibly an evolved NB) is abase station such as a master or secondary node base station (e.g., for NR or LTE long term evolution) that communicates with devices such as the gNB 12 and/or UE 10 and/or the wireless network 1. The gNB 13 includes one or more processors DP 13A, one or more memories MEM 13B, one or more network interfaces, and one or more transceivers TRANS 12D interconnected through one or more buses. In accordance with the example embodiments these network interfaces of gNB 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the gNB 13 to perform one or more of the operations as described herein. The gNB 13 may communicate with another gNB and/or eNB such as the gNB 12 and the UE 10 or any other device using, e.g., link 11 or another link. These links maybe wired or wireless or both and may implement, e.g., an X2 or Xn interface. Further, as stated above the link 11 may be through other network devices such as, but not limited to an NCE/MME/SGW device such as the NCE 14 of FIG. 2.

The one or more buses of the device of FIG. 2 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the gNB 12 being physically in a different location from the RRH, and the one or more buses 157 could be implemented in part as fiber optic cable to connect the other elements of the gNB 12 to a RRH.

It is noted that although FIG. 2 shows network nodes e.g. base stations as a gNB 12 and a gNB 13, these devices can incorporate an eNodeB or eNB such as for LTE, and would still be configurable to perform example embodiments of the invention.

Also it is noted that description herein indicates that "cells" perform functions, but it should be clear that the gNB that forms the cell will perform the functions. The cell makes up part of a gNB. That is, there can be multiple cells per gNB.

The wireless network 1 may include a network control element (NCE) 14 that may include MME (Mobility Management Entity)/SGW (Serving Gateway) functionality, and which provides connectivity with a further network, such as a telephone network and/or a data communications network (e.g., the Internet). The gNB 12 and the gNB 13 are coupled via a link 13 and/or link 14 to the NCE 14.

The NCE 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM 14B and the computer program code PROG 14C are configured to, with the one or more processors DP 14A, cause the NCE 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, gNB 12, gNB 13, and other functions as described herein.

In general, the various embodiments of the user equipment 10 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One main application of this proposal is a case with multiple connections. Such a case where the network instructs the UE to completely blank a specific uplink timeslot of a first connection, but the UE can still use the timeslot for the uplink of a second connection.

It will be advantageous to revise the HARQ timing for this case in a way, that control information which are usually expected in the blanked timeslots, are postponed and transmitted (and expected) in one of the next possible uplink occasion. This has to be well-known to both network (e.g. eNB) and UE.

Solution with Extented TDD Patterns

Figure 5:
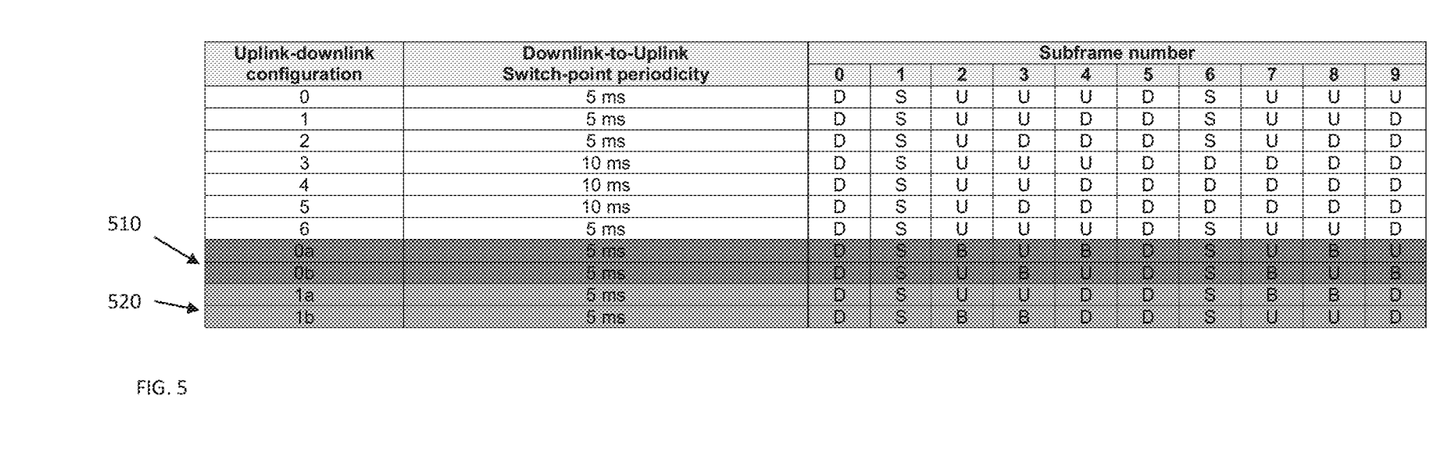
FIG. 5 shows Table 3 of Patterns of LTE.

One main driver for this invention is the case of dual connected handover in LTE TDD, as described above. So, the most intuitive solution is to extend the existing TDD table which was shown in Table 1 of FIG. 1A. In FIG. 5 two examples 510 and 520 are shown in the TDD table of FIG. 5.

For the example configuration 0a and 0b of FIG. 5, there is derived a pair of TDD patterns 510 with mutually exclusive uplinks from original configuration 0. "B" indicates that this subframe is blanked, i.e. neither used by uplink nor by downlink. If the source cell uses 0a, and the target cell uses 0b, the uplinks will never be used at the same time, RF impairments are avoided and an implementation with single uplink chain is possible in principle.

The TDD patterns example 520 of FIG. 5 follows exactly the same principle. Configurations 1a and 1b are derived from original configuration 1. In this example, the UE has more time to switch the uplink from one (source) connection to the other (target) connection. In case the source and target connection are not fully synchronous, this may have significant advantages, since otherwise a guard interval might be needed. In the green example (0a/0b), the uplink of one connection follow the uplink of the other connection without any time for switching. This may create massive problems with a single transmitter chain implementation.

As already mentioned above, it would be advantageous to clarify the HARQ timing, otherwise the missing HARQ feedback would lead to inefficiencies. For the TDD patterns it has already been clarified which uplink subframes carry the HARQ feedback for which downlink subframes. With additionally blanked uplink subframes, this design has to be revisited e.g. in a way where the HARQ feedback expected in the blanked subframes is transmitted in one of the next possible uplink occasions.

Solution with Muting Patterns

In case of FDD, as described above the existing TDD patterns can be abused. For the sake of completeness, we would like to give a simple example how muting patterns could be used alternatively (if more flexibility is needed). An intuitive choice is to re-use the principles of the muting patterns which have been defined for eICIC. Recall, that eICIC was only for downlink, it was not referring to full muting, and "mutually exclusive" was not a design criteria. So direct reuse is not possible.

Figure 6:
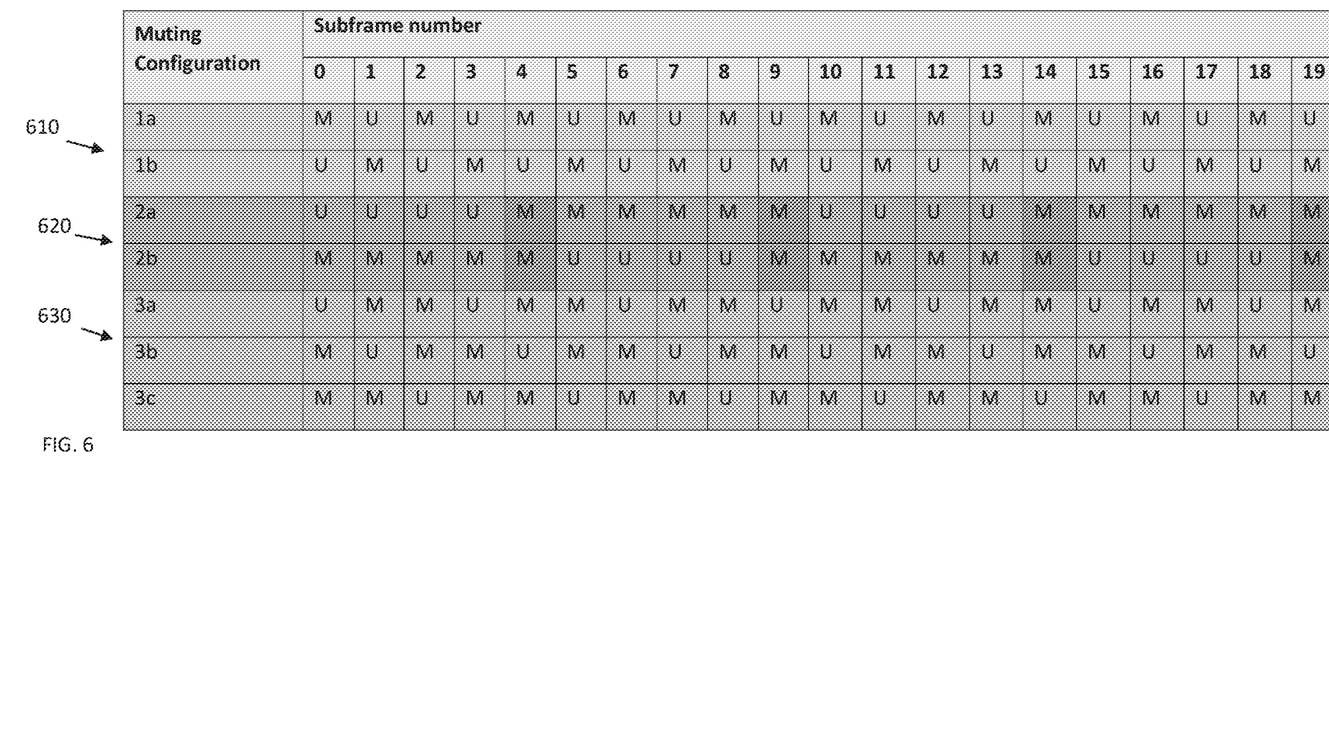
FIG. 6 shows Table 1 of Uplink Muting Patterns.

Whereas the muting patterns in eICIC can be freely defined (signalled as a bit string of 40 bit, where "1" indicates "almost blank subframes"), we have to concretely specify the patterns for our purpose in order to clarify the HARQ timing. Table 4 of FIG. 6 provides three examples for tuples 610, 620, and 630 of mutually exclusive muting patterns with 20 subframes (with the 20 subframes being used as a non-limiting example). In FIG. 6 a "U" indicates a regular uplink, whereas an "M" indicates a completely muted subframe, where the UE is not allowed to transmit to a given cell.

The first consists of a pair of mutually exclusive muting patterns, one for a source cell and one for a target cell. The pattern minimizes uplink interruptions, each connection can use every second subframe. The second example is a better solution when the switching between the uplinks should create problems (e.g. if the uplinks are asynchronous). Switching happens only every $5^{th}$ subframe, furthermore a "guard subframe" (in grey) is inserted where both cells are muting, to allow for a more relaxed switching. The third example consists of three muting patterns for the case where 3 cells are involved, i.e. if the UE has 3 simultaneous connections.

Note that examples embodiments in accordance with the invention can also easily be extended to 3 simultaneous connections, although they have been explained for only 2 (which is currently the most relevant case).

If/when a UE is configured with a set of muted UL subframes, there are multiple potential solutions that may address the HARQ-ACK signalling "overflow". One approach is to target "bundling", meaning that the HARQ-ACK feedback is simply aggregated into a single codebook through logical AND operation, meaning that in case one of the muted UL subframes would have to carry a NACK, the final transmitted value would be NACK, causing all impacted/reported DL subframes would be marked as erroneously received.

In one embodiment of the invention the UE would be configured with additional physical resources for the non-muted subframes, where it would be able to directly map the generated HARQ-ACK information, such that the eNB would be receiving HARQ related feedback information at a later stage than expected. This would potentially create delay impacts to the HARQ cycle, and UE throughput would be reduced. However, a degradation should be expected from introducing complete blanking into a system that is operating with a tight coupling of the HARQ timing.

Figure 7A:
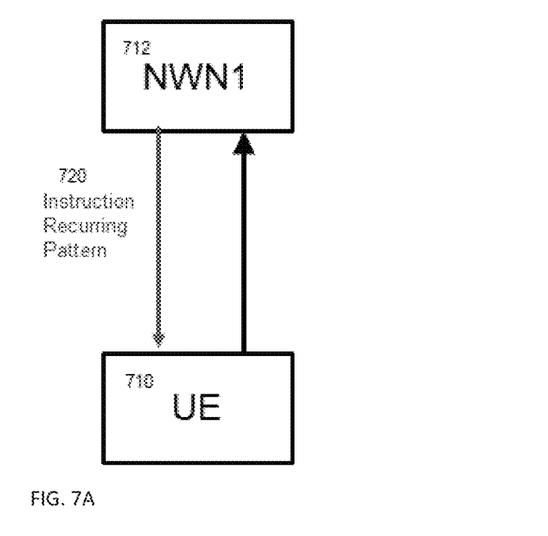
FIG. 7A, FIG. 7B, and FIG. 7C each show communication operations in accordance with example embodiments of the invention.

FIG. 7A shows communication in accordance with example embodiments of the invention between network node NWN1 712 and UE 710 using instructions with a recurring pattern 720. NWN1 712 determines that a communication sent from a user equipment 710 to the network node NWN1 712 comprising signaling over continuous timeslots of one uplink connection would cause a problem with the communication, and sends instructions 720 preventing the UE 710 from sending the signaling over at least one particular time slot to overcome the problem, wherein the instructions 720 are sent in a recurring pattern.

Figure 7B:
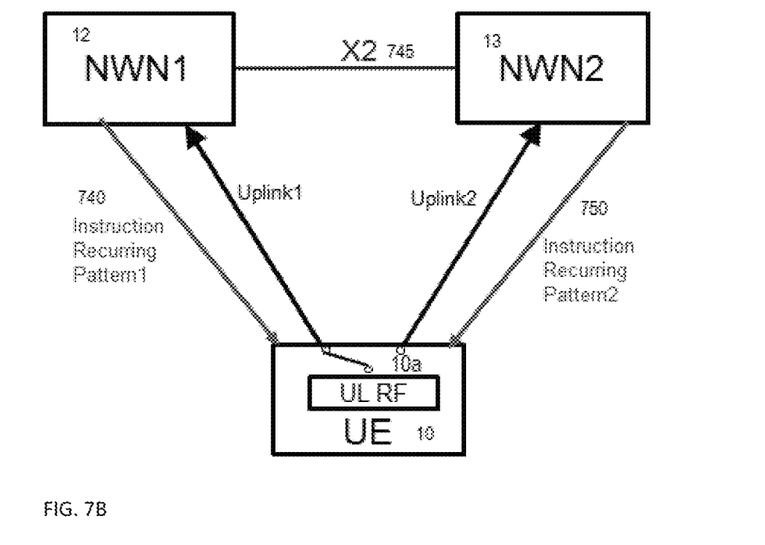

FIG. 7B shows communication in accordance with example embodiments of the invention between NWN1 12, NWN2 13 and UE 10 in dual connected mode. The UE 10 of FIG. 7B is performing an uplink transmission uplink1 to NWN1 12 using instructions with a recurring pattern1 740 from NWN1 12, and performing an uplink transmission uplink2 to NWN2 13 using instructions from NWN2 13 with a recurring pattern2 750 from NWN2 13. As shown in FIG. 7B the UE 10 is using a single UL RF. Further, as shown in FIG. 7B the NWN1 12 and the NWN2 13 are coordinating the instructions over the X2 745 before sending the instructions recurring pattern 1 and/or 2 to the UE 10. The coordination results in recurring patterns 1 740 and recurring patterns 2 750 such that the single UL RF 10a can serve both uplinks, i.e. the UE always blanks one uplink when the other has to transmit.

Figure 7C:
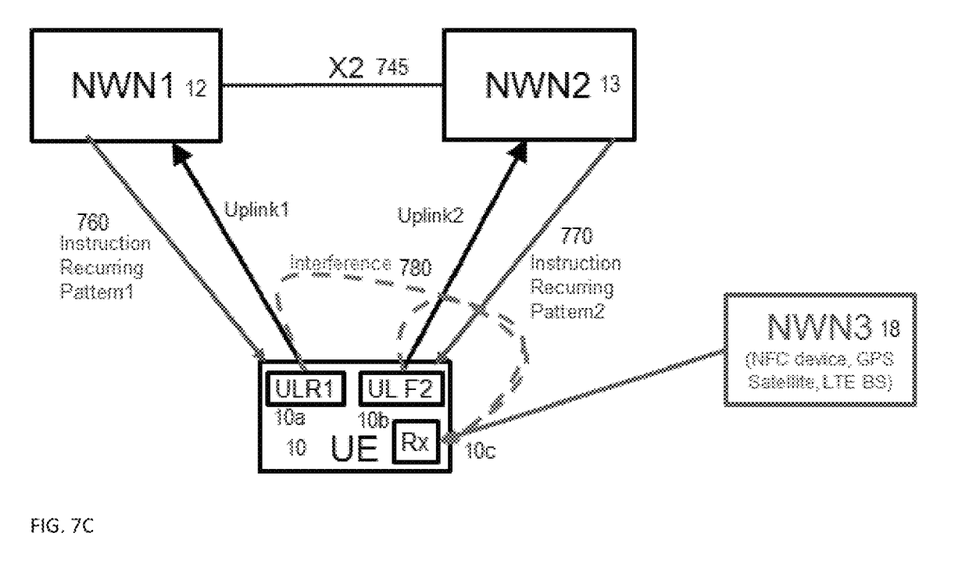

FIG. 7C shows communication in accordance with example embodiments of the invention between NWN1 12, NWN2 13 and UE 10 in dual connected mode. The UE 10 of FIG. 7B is performing an uplink1 to NWN1 12 using instructions with a recurring pattern1 760 from NWN1 12, and performing an uplink2 to NWN2 13 using instructions from NWN2 13 with a recurring pattern2 770 from NWN2 13. The instructions with a recurring pattern1 760 and 770 are configured to avoid the interference 780 (e.g. intermodulation) towards the receiver Rx 10x which may receive signals from NWN3 18 as shown in FIG. 7C. NWN3 18 may coincide with NWN1 12 or NWN2 13, or it may be another node, e.g. from a different radio access technology. As shown in FIG. 7C the UE 10 is using ULR1 10a (frequency part 1) and/or ULF2 10b (frequency part 2) for RF communication with NWN1 12 and is using a ULF2 10b (frequency part 2) and/or ULR1 10a (frequency part 1) for RF communication with NWN2 13. Also as shown in FIG. 7B the NWN1 12 and the NWN2 13 coordinate the instructions over the X2 745 before sending the instructions to the UE 10.

Figure 8A:
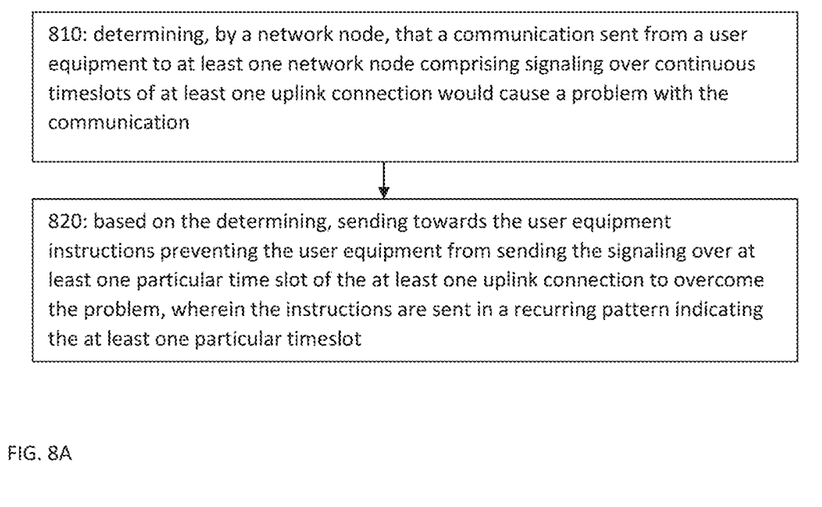
FIG. 8A and FIG. 8B each show a method which may be performed by an apparatus in accordance with example embodiments of the invention.

FIG. 8A illustrates operations which may be performed by a network node such as, but not limited to, a network node gNB 12 as in FIG. 2 or an eNB. As shown in step 810 of FIG. 8A there is determining, by a network node, that a communication sent from a user equipment to at least one network node comprising signaling over continuous timeslots of at least one uplink connection would cause a problem with the communication. Then as shown in step 820 of FIG. 8A there is based on the determining, sending towards the user equipment instructions preventing the user equipment from sending the signaling over at least one particular time slot of the at least one uplink connection to overcome the problem, wherein the instructions are sent in a recurring pattern indicating the at least one particular timeslot.

In accordance with the example embodiments as described in the paragraph above, wherein the communication from the user equipment is sent to at least two network nodes using multi-connectivity, and wherein the instructions are preventing the user equipment from sending more than one uplink signal in one time slot.

In accordance with the example embodiments as described in the paragraphs above, wherein one of the at least two network nodes is a source node for a handover, and at least one other of the at least two network nodes is a target node for the handover.

In accordance with the example embodiments as described in the paragraphs above, wherein the communication from the user equipment is sent to the at least two network nodes using time division duplex patterns defined for the user equipment.

In accordance with the example embodiments as described in the paragraphs above, wherein the instructions are based on an enhancement of the time division duplex patterns defined for the user equipment such that at least one subframe defined as uplink subframe is prevented from both uplink and downlink transmissions.

In accordance with the example embodiments as described in the paragraphs above, wherein the instructions are coordinated between the at least two network nodes using an X2 interface before sending the instructions to the user equipment.

In accordance with the example embodiments as described in the paragraphs above, wherein the problem comprises a radio frequency impairment such that the user equipment is unable to receive another signal when sending the at least one uplink signaling to the at least one network node.

In accordance with the example embodiments as described in the paragraphs above, wherein the problem comprises user equipment implementation with only one radio frequency part, such that the user equipment is not able to send more than one uplink signaling to one network node at the same time.

In accordance with the example embodiments as described in the paragraphs above, wherein the instructions comprise additional physical resources associated with recurring patterns defined for the user equipment which are not prevented from sending uplink signals to enable the user equipment to at least map acknowledgement information for hybrid automatic repeat request related feedback information at a later stage than expected.

A non-transitory computer-readable medium (MEM 12B and/or MEM 13B as in FIG. 2) storing program code (PROG 12C and/or PROG 13C as in FIG. 2), the program code executed by at least one processor (DP 12A and/or DP 13A as in FIG. 2) to perform the operations as at least described in the paragraphs above.

In accordance with an example embodiment of the invention as described above there is an apparatus comprising: means for determining (MEM 12B and/or MEM 13B, including PROG 12C and/or PROG 13C executed by DP 12A and/or DP 13A as in FIG. 2), by a network node (gNB 12 or gNB 13 as in FIG. 2), that a communication sent from a user equipment (UE 10 as in FIG. 2) to at least one network node comprising signaling over continuous timeslots of at least one uplink connection would cause a problem with the communication. Then means, based on the determining, for sending (MEM 12B and/or MEM 13B, including PROG 12C and/or PROG 13C executed by DP 12A and/or DP 13A as in FIG. 2) towards the user equipment instructions preventing the user equipment from sending the signaling over at least one particular time slot of the at least one uplink connection to overcome the problem, wherein the instructions are sent in a recurring pattern indicating the at least one particular timeslot.

In the example aspect of the invention according to the paragraph above, wherein at least the means for determining and sending comprises a non-transitory computer readable medium [MEM 12B and/or MEM 13B as in FIG. 2] encoded with a computer program [PROG 12C and/or PROG 13C as in FIG. 2] executable by at least one processor [DP 12A and/or DP 13A as in FIG. 2].

Figure 8B:
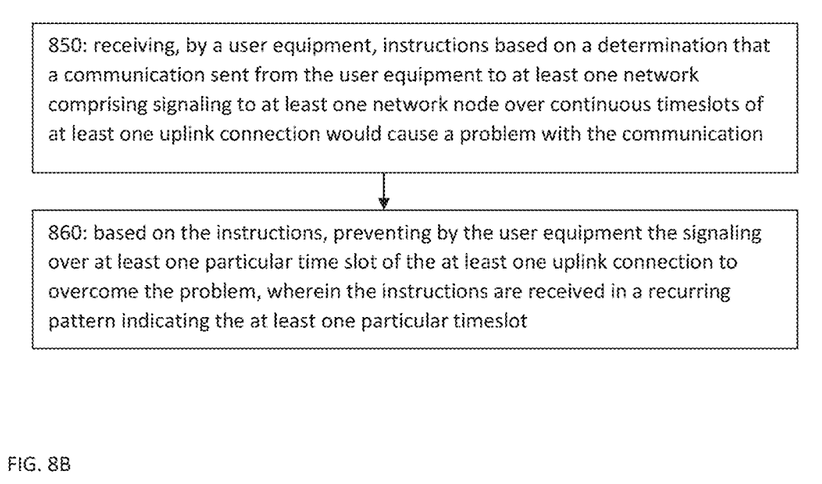

FIG. 8B illustrates operations which may be performed by a device such as, but not limited to, a device (e.g., the UE 10 as in FIG. 2). As shown in step 850 of FIG. 8B there is receiving, by a user equipment, instructions based on a determination that a communication sent from the user equipment to at least one network comprising signaling to at least one network node over continuous timeslots of at least one uplink connection would cause a problem with the communication. Then as shown in step 860 of FIG. 8B there is, based on the instructions, preventing by the user equipment the signaling over at least one particular time slot of the at least one uplink connection to overcome the problem, wherein the instructions are received in a recurring pattern indicating the at least one particular timeslot.

In accordance with the example embodiments as described in the paragraph above, wherein the communication from the user equipment is sent to at least two network nodes using multi-connectivity, and wherein the instructions are preventing the user equipment from sending more than one uplink signal in one time slot.

In accordance with the example embodiments as described in the paragraphs above, wherein one of the at least two network nodes is a source node for a handover, and at least one other of the at least two network nodes is a target node for the handover.

In accordance with the example embodiments as described in the paragraphs above, wherein the communication from the user equipment is sent to the at least two network nodes using time division duplex patterns defined for the user equipment.

In accordance with the example embodiments as described in the paragraphs above, wherein the instructions are based on an enhancement of the time division duplex patterns defined for the user equipment such that at least one subframe defined as uplink subframe is prevented from both uplink and downlink transmissions.

In accordance with the example embodiments as described in the paragraphs above, wherein the instructions are coordinated between the at least two network nodes using an X2 interface before the instructions are received by the user equipment.

In accordance with the example embodiments as described in the paragraphs above, wherein the problem comprises a radio frequency impairment such that the user equipment is unable to receive another signal when sending the at least one uplink signaling to the at least one network node.

In accordance with the example embodiments as described in the paragraphs above, wherein the problem comprises user equipment implementation with only one radio frequency part, such that the user equipment is not able to send more than one uplink signaling to one network node at the same time.

In accordance with the example embodiments as described in the paragraphs above, wherein the instructions comprise additional physical resources associated with recurring patterns defined for the user equipment which are not prevented from sending uplink signals to enable the user equipment to at least map acknowledgement information for hybrid automatic repeat request related feedback information at a later stage than expected.

A non-transitory computer-readable medium (MEM 10B as in FIG. 2) storing program code (PROG 10C as in FIG. 2), the program code executed by at least one processor (DP 10A as in FIG. 2) to perform the operations as at least described in the paragraphs above.

In accordance with an example embodiment of the invention as described above there is an apparatus comprising: means for receiving (MEM 10B, including PROG 10C executed by DP 10A as in FIG. 2), by a user equipment (UE 10 as in FIG. 2), instructions based on a determination that a communication sent from the user equipment to at least one network comprising signaling (MEM 10B, including PROG 10C executed by DP 10A as in FIG. 2) to at least one network node (gNB 12 and/or gNB 13 as in FIG. 2) over continuous timeslots of at least one uplink connection would cause a problem with the communication. Then means, based on the instructions, for preventing (MEM 10B, including PROG 10C executed by DP 10A as in FIG. 2) by the user equipment the signaling over at least one particular time slot of the at least one uplink connection to overcome the problem, wherein the instructions are received in a recurring pattern indicating the at least one particular timeslot.

In the example aspect of the invention according to the paragraph above, wherein at least the means for receiving and preventing comprises a non-transitory computer readable medium [MEM 10B as in FIG. 2] encoded with a computer program [PROG 10C as in FIG. 2] executable by at least one processor [DP 10A as in FIG. 2].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is may be used herein is to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   receiving, by a user equipment, instructions from a network node, the instructions are received in a recurring pattern indicating the user equipment is prevented from signaling over at least one particular time slot of at least one uplink connection, wherein the user equipment has an uplink connection with a source node for a handover and has an uplink connection with a target node for the handover, and wherein the recurring pattern comprises time or frequency duplex patterns with mutually exclusive uplinks for the source node and the target node; and
   based on the instructions, preventing by the user equipment the signaling over the at least one particular time slot of the at least one uplink connection.

2. The method of claim 1, wherein the instructions indicating the user equipment is prevented from signaling over at least one particular time slot of at least one uplink connection comprises preventing the user equipment from sending more than one uplink signal in one time slot.

3. The method of claim 1, wherein the user equipment is communicating with at least two network nodes using time division duplex patterns defined for the user equipment.

4. The method of claim 1, wherein the recurring pattern comprises a pair of time division duplex patterns with mutually exclusive uplinks for the source node and the target node.

5. The method of claim 1, wherein the user equipment is communicating with at least two network nodes using frequency division duplex patterns defined for the user equipment.

6. The method of claim 1, wherein the recurring pattern comprises a pair of frequency division duplex patterns with mutually exclusive muting patterns for the source node and the target node.

7. The method of claim 1, wherein the instructions further comprise additional physical resources associated with recurring patterns defined for the user equipment which are not prevented from sending uplink signals to enable the user equipment to at least map acknowledgement information for hybrid automatic repeat request related feedback information at a later stage than expected.

8. An apparatus comprising:
   at least one processor; and
   at least one memory including computer program code, where the at least one memory and the computer program code are configured, with the at least one processor, to cause the apparatus to at least:
   receive instructions from a network node, the instructions are received in a recurring pattern indicating the apparatus is prevented from signaling over at least one particular time slot of at least one uplink connection, wherein the apparatus has an uplink connection with a source node for a handover and has an uplink connection with a target node for the handover, and wherein the recurring pattern comprises time or frequency duplex patterns with mutually exclusive uplinks for the source node and the target node; and
   based on the instructions, prevent the signaling over the at least one particular time slot of the at least one uplink connection.

9. The apparatus of claim 8, wherein the instructions indicating the apparatus is prevented from signaling over at least one particular time slot of at least one uplink connection comprises preventing the apparatus from sending more than one uplink signal in one time slot.

10. The apparatus of claim 8, wherein the apparatus is communicating with at least two network nodes using time division duplex patterns defined for the apparatus.

11. The apparatus of claim 8, wherein the recurring pattern comprises a pair of time division duplex patterns with mutually exclusive uplinks for the source node and the target node.

12. The apparatus of claim 8, wherein the apparatus is communicating with at least two network nodes using frequency division duplex patterns defined for the apparatus.

13. The apparatus of claim 8, wherein the recurring pattern comprises a pair of mutually exclusive muting patterns for the source node and the target node.

14. The apparatus of claim 8, wherein the recurring pattern comprises at least two time division duplex patterns with mutually exclusive uplinks for at least two simultaneous uplink connections.

15. The apparatus of claim 8, wherein the recurring pattern comprises at least two frequency division duplex patterns with mutually exclusive uplinks for at least two simultaneous uplink connections.

16. The apparatus of claim 8, wherein the instructions further comprise additional physical resources associated with recurring patterns defined for the apparatus which are not prevented from sending uplink signals to enable the apparatus to at least map acknowledgement information for hybrid automatic repeat request related feedback information at a later stage than expected.

17. An apparatus comprising:
   at least one processor; and
   at least one memory including computer program code, where the at least one memory and the computer program code are configured, with the at least one processor, to cause the apparatus to at least:
   determine that a communication sent from a user equipment comprising signaling over continuous time slots of at least one uplink connection would cause a problem intermodulation with the communication; and
   based on the determining, send instructions towards the user equipment, the instructions are sent in a recurring pattern indicating the user equipment is prevented from signaling over at least one particular time slot of at least one uplink connection, and wherein the recurring pattern comprises time or frequency duplex patterns with mutually exclusive uplinks for a source node and a target node during handover.

18. The apparatus of claim 17, wherein the instructions indicating the user equipment is prevented from signaling over at least one particular time slot of at least one uplink connection comprises preventing the user equipment from sending more than one uplink signal in one time slot.

* * * * *